Figure 1:
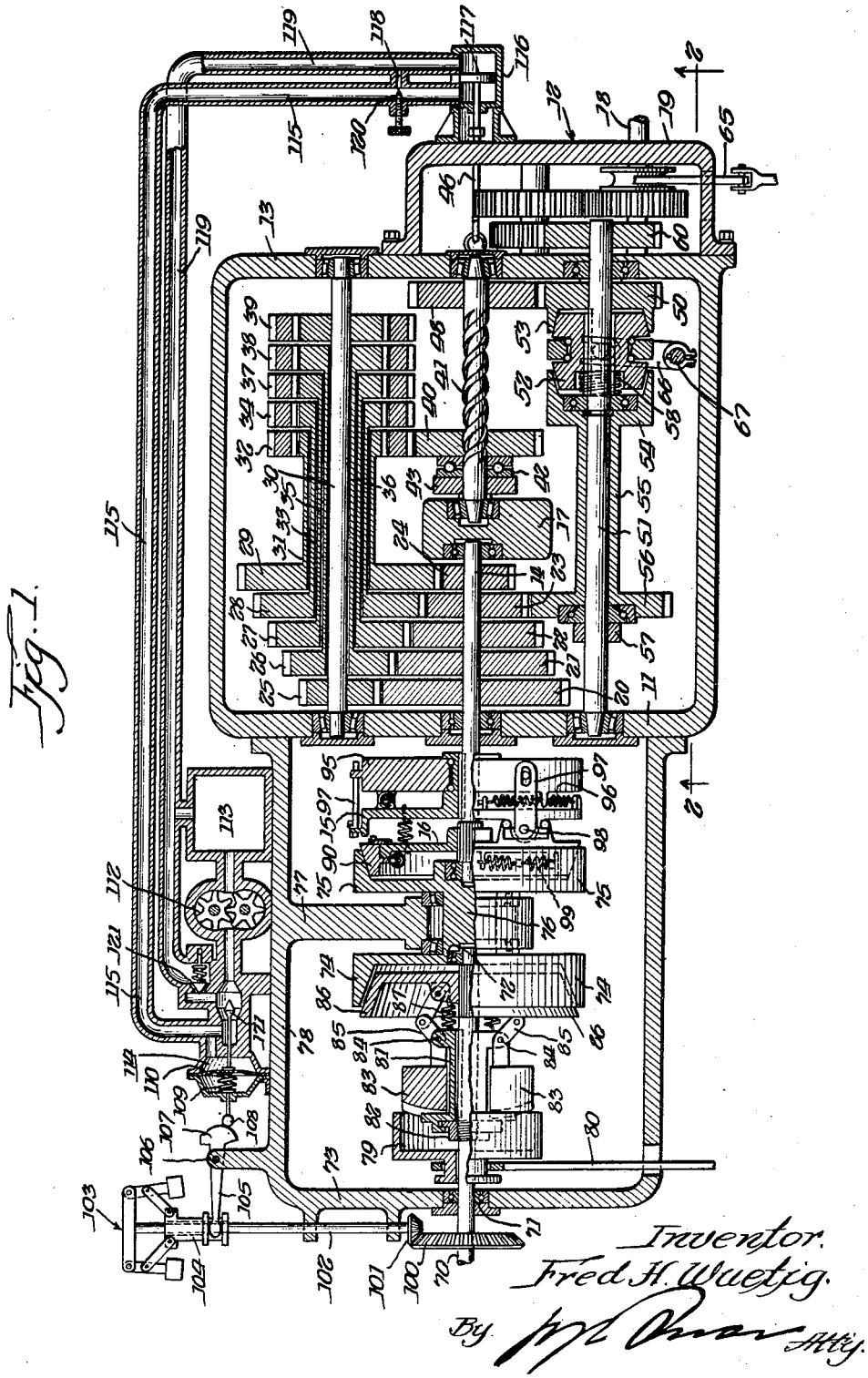

June 3, 1952 F. H. WUETIG 2,599,216
AUTOMATIC VARIABLE-SPEED TRANSMISSION
Filed July 27, 1950 2 SHEETS—SHEET 1

Inventor.
Fred H. Wuetig.
By [signature] Atty.

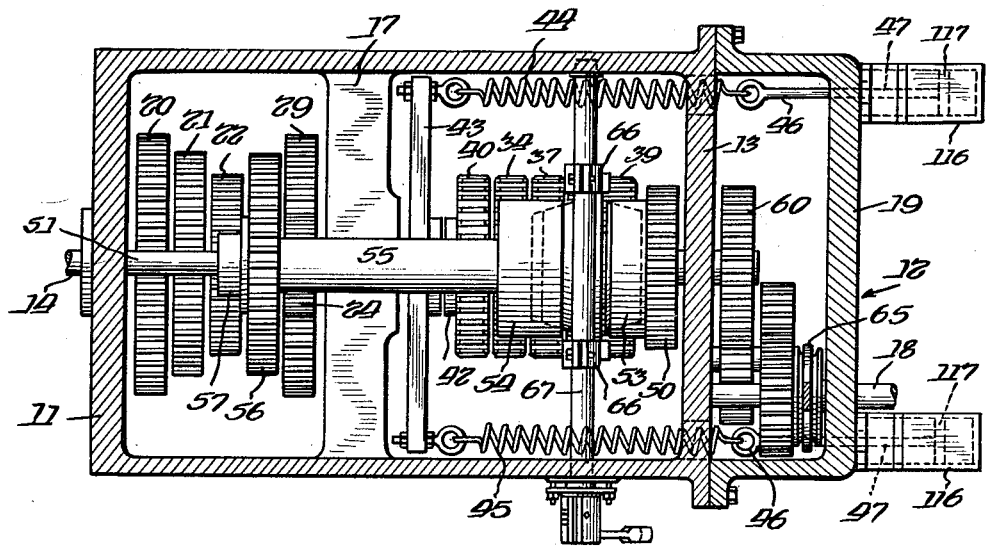

Patented June 3, 1952

2,599,216

UNITED STATES PATENT OFFICE 2,599,216

AUTOMATIC VARIABLE-SPEED TRANSMISSION

Fred H. Wuetig, Chicago, Ill.

Application July 27, 1950, Serial No. 176,148

11 Claims. (Cl. 192—3.5)

This invention is concerned with an automatic power and speed transmission which may be used, for example, for transmitting driving power from the drive shaft to the driven shaft of an automobile. The present application is a continuation-in-part of my co-pending application Ser. No. 703,508, filed October 16, 1946, now Patent 2,520,352, dated August 20, 1950.

The above noted patent discloses a speed-changing transmission in which a substantially constant torque load is automatically maintained on a driving transmission member in the presence of varying torque loads on the driven member. The present invention provides (a) control features for governing the torque load on the driving transmission member in accordance with the engine speed, that is, for controlling the speed ratio by the engine speed efficiency curve; (b) control features for accomplishing a smooth transition of the speed transmission gears; and (c) control features for governing the idling speed clutch release.

Details of the invention and its various objects and features will be brought out in the description which will be presented below with reference to the accompanying drawings. In these drawings, Fig. 1 shows an embodiment of the invention with some parts partially in elevation and in sectional view, respectively; and Fig. 2 is a sectional view through the right hand portion of the casing of the mechanism showing the gear means and the actuating means therefor, as seen when looking in the direction of the arrows along line 2—2 of Fig. 1.

The drawing Fig. 1 shows at the right of the casing or housing wall 11 the transmission gear mechanism also disclosed in the previously mentioned patent. See also Fig. 2. Numeral 12 indicates an auxiliary housing containing the reversing gears. A portion of the end wall 13 of the transmission housing separates the reversing gears from the transmission gears. Suitable plugs may be provided for filling the housing with oil and for draining oil and sludge therefrom.

The transmission driving shaft 14 projects from the wall 11 of the transmission housing to the left through a suitable bearing. Keyed to the shaft 14 is a plate 15, and splined on the left end thereof is the clutch plate 16. The purpose and operation of the plates 15—16 will be explained presently, after completion of the description of the transmission gears.

The transmission housing forms interiorly a mounting rib 17 which extends transversely therein, in a direction perpendicular to the plane of the drawing, between the front and rear walls thereof. The inner end of the driving shaft 14 is rotatably mounted in a bearing in the mounting rib 17, as shown. The driven shaft 18 enters the structure through the end wall 19 of the auxiliary housing 12. It may be journalled in suitable bearings in the walls 19 and 13, respectively.

Keyed to the transmission driving shaft 14 are a plurality of stepped gears, e. g., five gears 20—24. These are the driving gears and always rotate with the shaft 14. They mesh with the driven countershaft gears 25—29; i. e., the driving gear 20 meshes with the countershaft gear 25, and the successively smaller driving gears 21—24 mesh, respectively, with the successively larger driven countershaft gears 26—29, as clearly shown in the drawing. The small driven countershaft gear 25 is keyed directly to the countershaft 30, which is rotatably journalled in bearings disposed in the end walls of the transmission gear housing. Each of the remaining driven countershaft gears 26—29 is carried at the end of a tubular sleeve, and each such sleeve carries at its opposite end an individual associated transmission gear wheel. The sleeves are in telescoping relationship, one being rotatable on the other. Thus, as shown, the driven countershaft gear 29 is disposed at one end of the tubular sleeve 31 which carries at its opposite end the transmission gear wheel 32; the countershaft gear 28 is disposed at one end of the tubular sleeve 33 which is provided at its other end with the transmission gear wheel 34; and the driven countershaft gears 27 and 26 are similarly disposed at the ends of the sleeves 35—36 which in turn carry the transmission gear wheels 37—38, respectively. Next to the transmission gear wheel 38 is disposed the transmission gear wheel 39 which is keyed to the countershaft 30.

It will be seen from the foregoing explanations that all of the countershaft gears 25—29 rotate responsive to rotation of the shaft 14, and accordingly all of the transmission gear wheels 32, 34, 37, 38 and 39 rotate likewise each, however, at a different speed, depending on the gear ratio between the corresponding stepped gears 20—24 and the associated countershaft gears 25—29 driven thereby.

As described and shown in the previously mentioned patent, each of the transmission gear wheels 32, 34, 37, 38 and 39 may be provided with means forming what is usually referred to as a silent ratchet, to allow the peripheral rim carrying the gear teeth to rotate in the normal drive direction only so as to prevent jamming of the transmission gear wheels when two of them are engaged by the travelling gear 40.

The travelling gear 40 is internally threaded or provided with a spirally or helically cut groove, preferably in a suitable bushing associated with the gear 40, which is in engagement with the exteriorly threaded or helically grooved intermediate drive shaft 41. The latter is rotatable at its inner end in a bearing provided in the mounting rib 17, and at its outer end in a bearing provided in the end wall 13 of the transmission housing. The travelling gear 40 is adapted to move longitudinally of the intermediate driven shaft 41 into mesh with any one of the transmission gear wheels 32, 34, 37, 38 or 39, so as to rotate the shaft 41 at the corresponding speed of rotation of the respective transmission gear wheel.

Numeral 42 indicates a thrust bearing which is slidable on the intermediate shaft 41 and which is in engagement with one side of the travelling gear 40. The thrust bearing is in turn engaged by a yoke 43 which is slidable relative to the shaft 41. The yoke 43 is a barlike member extending within the transmission housing, transversely thereof, in parallel with the mounting rib 17. Suitable means may be provided for guiding the yoke in its motion with the thrust bearing axially of the shaft 41, and for preventing undesirable angular displacement thereof. Attached to each end of the yoke 43 is a spring, as indicated in Fig. 2 at 44, 45, these springs extending in parallel with the shaft 41 from the opposite ends of the yoke 43 to the right in the direction of the housing wall 13. The free end of each spring carries an adjusting member such as 46, which extends therefrom through holes in the housing wall 13 and wall 19 of the auxiliary housing 12, respectively, into a cylinder 116. A control piston 117 is secured to the end of the adjusting member. A nut or collar 47 may be provided on each adjusting member 46 to prevent its inward displacement and therewith inward displacement of yoke 43, thrust bearing 42 and travelling gear 40 beyond a predetermined position.

The travelling gear 40 is thus resiliently biased in a direction for gear engagement with the high speed transmission gear 39. In normal, that is, in resting condition of the transmission, the travelling gear 40 will be in mesh with the gear 39, due to the pull exerted by the biasing springs which extend from the opposite ends of the yoke 43 and attempt to move the travelling gear to the right. The gear is shown in mesh with the low speed transmission gear 32 merely for convenience of description. The piston 117 is subject to displacement by oil pressure under the control of governing means operable by the engine speed, in a manner which will be presently described in detail, and the torque load put on the travelling gear 40 is therefore a function of the engine speed efficiency curve.

Keyed to the helically grooved intermediate driven shaft 41 is the intermediate gear 48. This gear is thus arranged for operation at varying speeds, depending on the gear engagement of the travelling gear 40 with one or the other of the transmission gear wheels 32, 34, 37, 38 or 39. In the position in which the travelling gear 40 is shown, in mesh with the transmission gear wheel 32, it will rotate the helically grooved intermediate driven shaft 41, and therewith the intermediate gear wheel 48, at a low speed which is determined by the gear ratio between the drive gear wheel 24 and the driven countershaft gear 29. The travelling gear 40 assumes this position in the presence of the maximum torque load on the intermediate driven shaft 41, e. g., when the vehicle is started from a dead stop.

The intermediate gear 48 is always in mesh with the clutch gear 50 which is rotatable on the auxiliary shaft 51. The latter is rotatably journalled in bearings in the housing walls 11 and 13, as shown. Splined to the shaft 51 and longitudinally movable on it is the clutch core 52. A skirt 53 extends from the gear 51 for clutching engagement with one end of the core 52. At the other end of the clutch core is provided a cupshaped clutch member 54 having a tubular extension 55 which carries at its opposite end the gear wheel 56. The bushing 57, which is keyed to the shaft 51, holds the structure comprising the gear wheel 56 and its tubular extension 55 carrying the clutch member 54 in predetermined position. Between the clutch core 52 and the clutch member 54 is disposed a spring 58 which holds the clutch core 52 normally in clutching engagement with the skirt 53 of the gear 50. Therefore, when the intermediate gear 48 rotates responsive to rotation of the shaft 41, it will rotate the clutch gear 50 and therewith the clutch core 52, to rotate the auxiliary shaft 51.

The gear 56 will idle during normal operation, having no function when the clutch core 52 is in clutching engagement with the gear 50. However, the fork 66 is actuated by the member 67 responsive to the actuation of the brake, to move the clutch core 52 out of engagement with the gear wheel 50 for the purpose of clutching the shaft 51 to the driving gear 23 so as to use the engine to supply additional brake power.

The auxiliary shaft 51 projects through the transmission housing wall 13 into the auxiliary housing 12 and carries a gear wheel 60 which is keyed to it. The latter transmits power to the driven shaft 18 of the vehicle and coacts with the reversing gears. The reversing operation is controlled by the movable fork 65.

The engine (not shown) drives the shaft 70 which is rotatably journalled in bearings such as 71—72, the bearing 71 being mounted in the wall 73 of a casing extending from the wall 11 of the transmission housing, and the bearing 72 being mounted in a clutch member forming the clutch elements 74—75 which extend from an axial connecting portion 76. The latter is rotatably journalled in bearings provided in an arm 77 which extends inwardly from the casing wall 78. A locking collar 79 is freely movably disposed on the shaft 70 so that it may be shifted by means of a fork 80. The sleeve 81 is keyed to the shaft 70 and may be adjusted in predetermined position by the nut 82. Attached to the sleeve 81 are centrifugally actuated fly members 83 which are pivotally mounted at 84. Links 85 connect the fly members 83 with the clutch member 86 which is splined to the shaft 70. Springs 87 tend to pull the clutch member 86 away from the clutch member 74 and normally hold the centrifugal fly members 83 nestled against the sleeve 81.

The above described relationship of the parts exists so long as the shaft 70 is rotated by the engine at idling speed. When the idling speed is exceeded, the centrifugal fly members 83 move outwardly about their pivots 84 and force the clutch member 86 into clutching engagement with the clutch face of member 74, thus rotating this clutch member to connect the engine with the transmission through the medium of the clutch member 75 which is engaged by the clutch member 90 carried by the plate 16 which is splined to the transmission driving shaft 14.

The transmission gears 20—24 now rotate and in turn rotate the stepped gears 25—29, to rotate at predetermined different speeds the transmission gears 32, 34, 37, 38 and 39, respectively. The clutching described occurs upon acceleration of the engine speed from a predetermined idling speed, for example, for the purpose of moving the vehicle from a dead stop. The travelling gear 40 is at this moment in mesh with the transmission gear 39 which rotates at high speed. There is a maximum torque load on the driven shaft 18, which is propagated to the helically grooved intermediate driven shaft 41 through the medium of the gears in the auxiliary housing 12, gear 60, auxiliary shaft 51, clutch core 52 and gear wheel 50 which is in mesh with the intermediate driven gear wheel 48. This maximum torque load, now being manifest on the intermediate driven shaft 41, overcomes the pull of the springs 44, 45 (Fig. 2) which bias the yoke 43, and therewith the travelling gear 40 to the right, and the travelling gear 40 moves from its initial position successively from gear engagement with the transmission gear wheel 39 into mesh with the transmission gear wheels 38, 37—34, and finally 32, thereby tensioning the biasing springs 44, 45 by displacement of the yoke 43 to the left into the position in which the yoke is shown in engagement with the thrust bearing 42, the latter being in engagement with the travelling gear 40. The maximum torque load on the driven shaft 18 is now overcome by transmitting driving power to the driven shaft from the low gear 24, countershaft gear 29 and associated transmission gear wheel 32 which is in mesh with the travelling gear 40.

The torque load on the driven shaft 18 decreases as the vehicle gains speed, and the tension on the biasing springs 44, 45 extending from the opposite ends of the yoke 43 can exert itself, moving the travelling gear 40 from the position shown to the right successively into mesh with the transmission gear wheels 34, 37, 38 and 39. The travelling gear 40 is finally in mesh with the transmission gear wheel 39 and thus transmits power directly to the driven shaft 18.

The successive gear engagement of the travelling gear 40 with the various transmission gear wheels may be facilitated by suitably beveling or mitering the teeth of the transmission gear wheels and also the teeth of the travelling gear 40 and by the silent ratchet mechanism previously mentioned, which is described in detail in the initially noted patent.

Compensating and cushioning means is provided in accordance with the invention which operates to prevent any jerking or jarring incident to the successive gear engagement of the travelling gear 40 with any of the transmission gear wheels 32, 34, 37, 38, 39 in either direction of motion of the travelling gear. This compensating and cushioning means will be described next.

The angular change of speed impulse responsive to the shifting of the travelling gear 40 is effective to the plate 15 which is keyed to the transmission shaft 14, as described before. Rotatably journalled on the hub of the plate 15 is the inertia plate member 95, as shown. This plate member is resiliently connected with the plate 15 by means of springs 96. Release levers 97 are provided, each such lever being rotatable about a pin 98 and connected with the inertia member 95 by a pin which fits loosely in a slot formed in the corresponding lever 97. A sudden change in the speed of rotation of the shaft 14, due to the automatic gear shifting, is transferred to the plate 15. The inertia member 95 lags behind the plate 15, causing deflection of the springs 96. The release levers 97, which are carried by the plate 15, are thus angularly displaced relative to the clutch plate 16 carrying the clutch member 90, pulling the clutch member 90 away from the clutch face of the clutch member 75. A slip is thus caused between the clutch members 75 and 90, and the speeds of the shafts 70 and 14 are gradually equalized. The clutch member 90 is mounted on the clutch plate 16 so that it is free to rotate independent thereof except for the resilient connection through the springs 99, thus preventing any jerking motion. The clutch plate 16 is splined to the shaft 14, as mentioned before.

The engine-driven shaft 70 may be positively disconnected from driving engagement with the automatic transmission by actuating the shifting fork 80 to move the locking collar 79 over the centrifugal fly members 83 to prevent the centrifugal outward displacement thereof upon accelerating the engine, thus preventing the driving engagement of the clutch member 86 with the clutch member 74.

The means for governing the speed ratio control in accordance with the engine speed efficiency curve comprises the bevel gear 100 which meshes with the bevel gear 101. The latter is carried on the shaft 102 which is rotatably journalled, for example, in arms projecting from the casing wall 73, as shown. A suitable speed governor shown in the form of a flyball governor 103 rotates with the shaft 102. The governor is adapted to displace a sleeve 104 which is engaged by lever 105. The latter is pivoted at 106 and carries a cam 107 which may correspond to the engine speed efficiency curve. A follower 108 coacts with the cam 107. The sleeve 104 moves up or down responsive to increase or decrease of the engine speed, causing angular displacement of the lever 105 and cam 107, and the latter moves the follower accordingly, inwardly or outwardly, from a normal position, in accordance with the formation of the cam. The follower operates against the pressure of a spring 109 which presses against the diaphragm 110. Attached to the diaphragm is the flow-regulating valve 111.

A continuously operating gear pump 112 is provided for forcing oil from a reservoir 113 into the chamber 114 when the valve 111 is open. When the oil pressure against the diaphragm 110 is greater than the pressure of the spring 109, the diaphragm will deflect and will cause closure of the valve.

The chamber 114 is connected with the conduit 115 which terminates in one end of the cylinder 116 containing the piston 117 which is connected with the adjusting members 46 of the biasing springs 44, 45 extending from the ends of the yoke 43 which bias the travelling gear 40 outwardly, as previously described.

The piston 117 is displaced by variations in the oil pressure in the conduit 115, thereby displacing the adjusting members 46 to vary the tension of the corresponding springs 44, 45 which bias the yoke 43 and therewith the travelling gear, as described. The tension of the biasing springs is therefore, in any position of the travelling gear 40, under control, depending on the engine speed, the curve of the engine speed efficiency thus entering as a factor in placing the travelling gear under a predetermined torque load.

An orifice 118 is provided for permitting oil to leak back into the return conduit 119 upon decrease of the pressure in the conduit 115, thereby allowing the pistons 117 to move inwardly, thus decreasing the tension of the torque load springs 44, 45. An adjustable needle valve 120 is provided for regulating the passage through the orifice 118 so as to obtain the best operating efficiency.

Numeral 121 indicates a relief valve to furnish a by-pass for the oil at a time when the valve 111 is closed.

Changes may be made within the scope and spirit of the accompanying claims in which is defined what is considered new and desired to have protected by Letters Patent of the United States.

I claim:

1. A variable speed-changing device having a driving shaft, a driven shaft, a plurality of counter gear wheels rotated by said driving shaft, a plurality of transmission gear wheels rotated by said counter gear wheels, a travelling gear wheel, means for moving said traveling gear wheel for driving engagement with any one of said transmission gear wheels to transmit power to said driven shaft, and means for transmitting power to said driving shaft comprising an engine-driven shaft, a drive clutch member driven by said engine-driven shaft, a coacting clutch element splined to said driving shaft for driving coaction with said drive clutch member, and inertia means rotatable with said driving shaft for operatively displacing said coacting clutch element relative to said drive clutch member for the purpose of causing gradual equalization of speeds between said driving shaft and said engine-driven shaft responsive to speed changes effected by said travelling gear wheel which affect the speed of rotation of said driving shaft.

2. The structure defined in claim 1, together with an idling clutch member coacting with said drive clutch member, an idling clutch element for said idling clutch member, said idling clutch element being splined to said engine-driven shaft, means for maintaining said idling clutch element normally out of engagement with said idling clutch member, and means operative by centrifugal forces responsive to a predetermined speed of rotation of said engine-driven shaft for causing said idling clutch element to move into clutching engagement with said idling clutch member for the purpose of rotating said drive clutch member to rotate said transmission driving shaft.

3. The structure defined in claim 1, together with an idling clutch member coacting with said drive clutch member, an idling clutch element for said idling clutch member, said idling clutch element being splined to said engine-driven shaft, means for maintaining said idling clutch element normally out of engagement with said idling clutch member, means operative by centrifugal forces responsive to a predetermined speed of rotation of said engine-driven shaft for causing said idling clutch element to move into clutching engagement with said idling clutch member for the purpose of rotating said drive clutch member to rotate said transmission driving shaft, and means for disabling said means which is operative by centrifugal forces.

4. The structure defined in claim 1, together with means governed by said engine-driven shaft for placing a torque load on said travelling gear wheel as a function of the engine speed efficiency curve.

5. A variable speed-changing device having a plurality of stepped gear wheels to rotate at different speeds a plurality of transmission gear wheels and having a travelling gear wheel for driving engagement with any one of said transmission gear wheels for the purpose of transmitting power to a driven shaft, and means for controlling the operation of said travelling gear wheel comprising a driving shaft for said stepped gear wheels, an engine-driven shaft, clutch means disposed between said engine-driven shaft and said driving shaft, biasing means for placing a resilient torque load on said travelling gear, control means for said biasing means, and means for governing the operation of said control means as a function of the engine speed efficiency curve.

6. The structure defined in claim 5, together with inertia means for causing slippage of said clutch means to equalize the speeds of said engine-driven shaft and said transmission driving shaft responsive to speed changes effected by said travelling gear wheel which affect the speed of rotation of said driving shaft.

7. The structure defined in claim 5, wherein said clutch means comprises an idling clutch for connecting said engine-driven shaft in driving engagement with said transmission driving shaft, and control clutch means for equalizing the speeds of rotation of said shafts to effect smooth continuous operation thereof incident to speed changes effected by said travelling gear wheel.

8. The structure defined in claim 5, wherein said clutch means comprises an idling clutch for connecting said engine-driven shaft in driving engagement with said transmission driving shaft, control clutch means for equalizing the speeds of rotation of said shafts to effect smooth continuous operation thereof incident to speed changes effected by said travelling gear wheel, and means for disabling said idling clutch means to prevent operative coupling of said shafts.

9. The structure defined in claim 5, wherein said control means comprises hydraulically operated means for coaction with said biasing means, and engine-driven governor means for controlling said hydraulically operated means.

10. The structure as set forth in claim 1, together with an idling clutch member coacting with said drive clutch member, an idling clutch element for said idling clutch member, said idling clutch element being splined to said engine-driven shaft, means for maintaining said idling clutch element normally out of engagement with said idling clutch member, and means operatively responsive to a predetermined speed of rotation of said engine-driven shaft for causing said idling clutch element to move into clutching engagement with said idling clutch member for the purpose of rotating said drive clutch member to rotate said transmission driving shaft.

11. The structure as set forth in claim 5, together with means operatively responsive to a predetermined speed of rotation of said engine-driven shaft for actuating said clutch means disposed between said engine-driven shaft and said driving shaft.

FRED H. WUETIG.

REFERENCES CITED

The following references are of record in the file of this patent:

UNITED STATES PATENTS

| Number | Name | Date |
|---|---|---|
| 1,102,378 | Zeitler | July 7, 1914 |
| 1,472,263 | Appleberg | Oct. 30, 1923 |
| 1,969,561 | Keller | Aug. 7, 1934 |
| 1,979,080 | Roeder | Oct. 30, 1934 |
| 2,138,534 | Buck | Nov. 29, 1938 |

FOREIGN PATENTS

| Number | Country | Date |
|---|---|---|
| 374,060 | Italy | Aug. 12, 1939 |